US010236701B2

(12) United States Patent
Song

(10) Patent No.: US 10,236,701 B2
(45) Date of Patent: Mar. 19, 2019

(54) SYSTEM, MOBILE DEVICE, AND CHARGING DEVICE

(71) Applicant: Huawei Device (Dongguan) Co., Ltd., Dongguan (CN)

(72) Inventor: Gang Song, Shenzhen (CN)

(73) Assignee: Huawei Device (Dongguan) Co., Ltd., Dongguan (CN)

( * ) Notice: Subject to any disclaimer, the term of this patent is extended or adjusted under 35 U.S.C. 154(b) by 0 days.

(21) Appl. No.: 15/974,070

(22) Filed: May 8, 2018

(65) Prior Publication Data

US 2018/0254645 A1 Sep. 6, 2018

Related U.S. Application Data

(63) Continuation of application No. 14/802,770, filed on Jul. 17, 2015, now Pat. No. 9,991,725, which is a continuation of application No. PCT/CN2014/070354, filed on Jan. 9, 2014.

(30) Foreign Application Priority Data

Jan. 18, 2013 (CN) .......................... 2013 1 0018595

(51) Int. Cl.
*H01M 10/46* (2006.01)
*H02J 7/00* (2006.01)

(52) U.S. Cl.
CPC .......... *H02J 7/0045* (2013.01); *H02J 7/0052* (2013.01); *H02J 7/0054* (2013.01); *H02J 2007/0062* (2013.01); *H02J 2007/0096* (2013.01)

(58) Field of Classification Search
CPC ........ H02J 7/355; H02J 7/0042; H02J 7/0059; H02J 2007/0062; H02J 2007/006

USPC .................................. 320/107, 111, 114, 115
See application file for complete search history.

(56) References Cited

U.S. PATENT DOCUMENTS

| 5,672,952 | A | 9/1997 | Szepesi |
| 7,271,568 | B2 | 9/2007 | Purdy et al. |
| 9,991,725 | B2* | 6/2018 | Song ..................... H02J 7/0052 |
| 2003/0148788 | A1 | 8/2003 | Kwak |
| 2004/0246341 | A1 | 12/2004 | Lee et al. |
| 2005/0127870 | A1 | 6/2005 | Shin |

(Continued)

FOREIGN PATENT DOCUMENTS

| CN | 2140581 Y | 8/1993 |
| CN | 2192974 Y | 3/1995 |

(Continued)

OTHER PUBLICATIONS

NTTFS4C05N, "Power MOSFET—30 V, 75 A, Single N-Channel, µ8FL,"Rev. 1,ON Semiconductor, December, 7 pages.

*Primary Examiner* — Edward Tso
(74) *Attorney, Agent, or Firm* — Slater Matsil, LLP

(57) ABSTRACT

Embodiments of the present invention relate to a charging method, a mobile device, and a charging device. The mobile device includes a battery and a connector, where the connector includes a charging pin and a ground pin. When the charging pin establishes a connection to an output pin of the charging device by using a charging cable or a battery charging stand, the charging pin receives a first current signal transmitted by the output pin of the charging device, and transmits the first current signal to an anode pin of a battery, so as to charge the battery.

19 Claims, 5 Drawing Sheets

(56) References Cited

U.S. PATENT DOCUMENTS

| | | |
|---|---|---|
| 2005/0174094 A1 | 8/2005 | Purdy et al. |
| 2007/0120531 A1 | 5/2007 | Huh |
| 2007/0229025 A1 | 10/2007 | Tsai et al. |
| 2009/0174366 A1 | 7/2009 | Ahmad et al. |
| 2009/0184688 A1 | 7/2009 | Kim et al. |
| 2010/0052620 A1 | 3/2010 | Wong |
| 2010/0060233 A1 | 3/2010 | Kung et al. |
| 2010/0085008 A1 | 4/2010 | Suzuki et al. |
| 2010/0246857 A1 | 9/2010 | Kajita |
| 2011/0057620 A1 | 3/2011 | Tsai et al. |
| 2011/0221604 A1 | 9/2011 | Johnson |
| 2013/0175977 A1 | 7/2013 | Tinaphong et al. |
| 2013/0234666 A1* | 9/2013 | Lei ................ H01M 10/44 320/111 |
| 2015/0326046 A1 | 11/2015 | Song |

FOREIGN PATENT DOCUMENTS

| | | |
|---|---|---|
| CN | 1435987 A | 8/2003 |
| CN | 2606979 Y | 3/2004 |
| CN | 1540833 A | 10/2004 |
| CN | 1620744 A | 5/2005 |
| CN | 1705183 A | 12/2005 |
| CN | 1815845 A | 8/2006 |
| CN | 101022278 A | 8/2007 |
| CN | 101383627 A | 3/2009 |
| CN | 101752892 A | 6/2010 |
| CN | 101803187 A | 8/2010 |
| CN | 101937205 A | 1/2011 |
| CN | 103107575 A | 5/2013 |
| EP | 2071696 A2 | 6/2009 |
| EP | 2424067 A1 | 2/2012 |
| JP | 2001251771 A | 9/2001 |
| JP | 2005086933 A | 3/2005 |
| JP | 2005518175 A | 6/2005 |
| JP | 2005237155 A | 9/2005 |
| JP | 2006238653 A | 9/2006 |
| JP | 2007020299 A | 1/2007 |
| JP | 2007052968 A | 3/2007 |
| JP | 2008027147 A | 2/2008 |
| JP | 2010158163 A | 7/2010 |
| JP | 2010162656 A | 7/2010 |
| JP | 2013013184 A | 1/2013 |
| RU | 85766 U1 | 8/2009 |

* cited by examiner

SYSTEM, MOBILE DEVICE, AND CHARGING DEVICE

CROSS-REFERENCE TO RELATED APPLICATIONS

This application is a continuation of U.S. patent application Ser. No. 14/802,770, filed on Jul. 17, 2015, which is a continuation of International Application PCT/CN2014/070354, filed on Jan. 9, 2014. The International Application claims priority to Chinese Patent Application No. 201310018595.9, filed on Jan. 18, 2013. All of the aforementioned patent applications are hereby incorporated by reference in their entireties.

TECHNICAL FIELD

The present invention relates to the field of communications technologies, and in particular, to a charging method, a mobile device, a charging device, and a charging system.

BACKGROUND

Currently, a user usually connects a mobile device (such as a mobile phone or a tablet computer) to an external power supply by using a charging device (such as a charger), so as to implement charging of the mobile device; or a user connects a mobile device to an external device by using a universal serial bus USB port, which can also implement data exchange between the mobile device and the external device or implement charging of the mobile device.

Current charging circuits cluster on a side of a mobile device; therefore, as calculated according to highest conversion efficiency 93% of a charging circuit in a current ideal situation, a charging circuit on the side of the mobile device generates a heat loss of 0.7 W, which causes a heat generation problem during a process of charging the mobile device, thereby bringing discomfort to a user in use.

In addition, with rapid development of mobile devices, battery capacities of the mobile devices are increasing, and a shorter charging time is required. If a conventional charging circuit continues to be used for charging a mobile device, a charging time is excessively long. Therefore, a USB power supply standard is added to a latest USB standard, a supply voltage is increased to 20 V, and a supply current is increased to 5 A, so as to quickly charge a mobile device in a short time. However, because of a significant increase in the supply voltage and the supply current, a heat generation problem during a process of charging the mobile device is more serious. When a current of 5 A is provided for a mobile device according to a latest USB power supply standard, a charging circuit on the side of the mobile device generates a heat loss of 7 W, and this heat loss cannot be endured by a current mobile device.

To resolve a current heat generation problem during a process of charging a mobile device, and to make the mobile device adapt to a charging mode in which an a supply voltage and a supply current have been increased, cooling measures such as graphite attaching or air cooling is used on the side of the mobile device, so as to reduce a heat loss generated during the process of charging the mobile device. However, in this method, a volume of the mobile device is increased, and when a charging current keeps increasing, the heat loss of the mobile device cannot be reduced radically, which are limitations of the prior art.

SUMMARY

Embodiments of the present invention provide a charging method, a mobile device, a charging device, and a charging system, which are used to implement charging of a mobile device with a high current, reduce a heat loss of the mobile device as much as possible, facilitate use of a user, and resolve a problem of limitations in the prior art.

According to a first aspect, an embodiment of the present invention provides a mobile device, where the mobile device includes a battery and a connector. The connector includes a charging pin and a ground pin. When the charging pin establishes a connection to an output pin of a charging device by using a charging cable or a battery charging stand, the charging pin receives a first current signal transmitted by the output pin of the charging device, and transmits the first current signal to an anode pin of a battery, so as to charge the battery.

With reference to the first aspect, in a first possible implementation manner, the mobile device further includes an analog switch. When the charging pin establishes a connection to the output pin of the charging device by using a charging cable or a battery charging stand, the analog switch connects the anode pin of the battery to the charging pin. The charging pin receives the first current signal transmitted by the output pin of the charging device, and transmits the first current signal to the anode pin of the battery by using the analog switch, so as to charge the battery.

With reference to the first possible implementation manner of the first aspect, in a second possible implementation manner, the mobile device further includes a charging circuit and a universal serial bus USB port. When the charging pin is disconnected from the output pin of the charging device, the analog switch disconnects the anode pin of the battery from the charging pin, and an output pin of the charging circuit is connected to the anode pin of the battery by using the analog switch. An input pin of the charging circuit is connected to the USB port, receives a second current signal transmitted by the USB port, and transmits the second current signal to the anode pin of the battery by using the output pin of the charging circuit and the analog switch, so as to charge the battery.

With reference to the first aspect or the first or the second possible implementation manner of the first aspect, in a third possible implementation manner, the mobile device further includes a controller and a voltage converting circuit. With one end connected to the charging pin, and the other end connected to the controller, the voltage converting circuit is configured to: when the charging pin establishes a connection to the output pin of the charging device by using a charging cable or a battery charging stand, convert a voltage of the charging pin and then transmit a converted voltage to the controller.

With reference to the third possible implementation manner of the first aspect, in a fourth possible implementation manner, the controller further includes a bus port, and the connector further includes a single-wire or multi-wire bus pin. The bus port is connected to the single-wire or multi-wire bus pin of the connector by using a bus, and is configured to transmit bus data or a control signal generated by the controller, so that the charging device adjusts the output first current signal after receiving the bus data or the control signal.

With reference to the first aspect or any one of the first to the fourth possible implementation manners of the first aspect, in a fifth possible implementation manner, the ground pin is connected to a first ground pin of the charging device by using the charging cable or the battery charging stand. The ground pin, a ground pin of the battery and a ground pin of the charging circuit are connected to each other.

With reference to the first aspect or any one of the first to the fifth possible implementation manners of the first aspect, in a sixth possible implementation manner, the connector is specifically a multi-pin port, a multi-contact port, or a port multiplexed with the USB port by using the analog switch.

According to a second aspect, an embodiment of the present invention provides a charging device, where the charging device includes a switch charger module and a charging circuit. The charging circuit includes an input pin and an output pin. The input pin is connected to an output pin of the switch charger module, and is configured to receive a first current signal transmitted by the output pin of the switch charger module. The output pin establishes a connection to a charging pin of a mobile device by using a charging cable or a battery charging stand, so as to use the first current signal to charge a battery of the mobile device.

With reference to the second aspect, in a first possible implementation manner, the charging circuit further includes a bus port. The bus port is connected to a single-wire or multi-wire bus pin of a connector in the mobile device by using a bus, and is configured to receive bus data or a control signal transmitted by the mobile device. The charging circuit is further configured to adjust the first current signal according to the bus data or the control signal.

With reference to the second aspect or the first possible implementation manner of the second aspect, in a second possible implementation manner, the charging circuit further includes a first ground pin and a second ground pin. The first ground pin is connected to a ground pin of the mobile device by using the charging cable or the battery charging stand. The second ground pin is connected to a ground pin of the switch charger module.

With reference to the second aspect or the first or the second possible implementation manner of the second aspect, in a third possible implementation manner, the charging circuit is specifically a switch charging circuit or a linear charging circuit.

According to a third aspect, an embodiment of the present invention provides a charging method. The charging method includes receiving, by a charging pin of a connector when the charging pin establishes a connection to an output pin of a charging device by using a charging cable or a battery charging stand, a first current signal transmitted by the output pin of the charging device. The charging method further includes transmitting, by the charging pin, the first current signal to an anode pin of a battery, so as to charge the battery.

With reference to the third aspect, in a first possible implementation manner, after the receiving, by a charging pin of a connector when the charging pin establishes a connection to an output pin of a charging device by using a charging cable or a battery charging stand, a first current signal transmitted by the output pin of the charging device, and before the transmitting, by the charging pin, the first current signal to an anode pin of a battery, the method further includes connecting, by an analog switch, the anode pin of the battery to the charging pin.

With reference to the first possible implementation manner of the third aspect, in a second possible implementation manner, the method further includes when the charging pin of the connector is disconnected from the output pin of the charging device, disconnecting, by the analog switch, the anode pin of the battery from the charging pin, and connecting an output pin of a charging circuit to the anode pin of the battery by using the analog switch. The method further includes receiving, by an input pin of the charging circuit, a second current signal by using a USB port; and transmitting, by the input pin of the charging circuit, the second current signal to the anode pin of the battery by using the output pin of the charging circuit and the analog switch, so as to charge the battery.

With reference to the third aspect or the first or the second possible implementation manner of the third aspect, in a third possible implementation manner, the method further includes generating, by a controller, bus data or a control signal; and transmitting, by the controller, the bus data or the control signal to the charging device, so that the charging device adjusts the output first current signal.

According to a fourth aspect, an embodiment of the present invention provides a charging system, where the charging system includes the mobile device according to the first aspect of the present invention or any one of the six possible implementation manners of the first aspect, and the charging device according to the second aspect of the present invention or any one of the three possible implementation manners of the second aspect.

Therefore, by means of an application of the charging method, the mobile device, the charging device, and the charging system that are provided in the embodiments of the present invention, the mobile device is connected to the charging device by using a charging cable or a battery charging stand, and receives a high current transmitted by the charging device, so as to charge a battery of the mobile device. In addition, a charging circuit that provides a high current is not included in the mobile device, but exists in the charging device, which makes the mobile device only receive a high current, so as to reduce a heat loss of the mobile device as much as possible. Further, a heat generation problem during a process of charging a mobile device in the prior art is resolved, the mobile device is also made to adapt to a charging mode in which a supply voltage and a supply current have been increased, and a solution in the prior art is also enriched.

DETAILED DESCRIPTION OF ILLUSTRATIVE EMBODIMENTS

To make the objectives, technical solutions, and advantages of the present invention clearer, the following further describes the embodiments of the present invention in detail with reference to the accompanying drawings.

Figure 1:
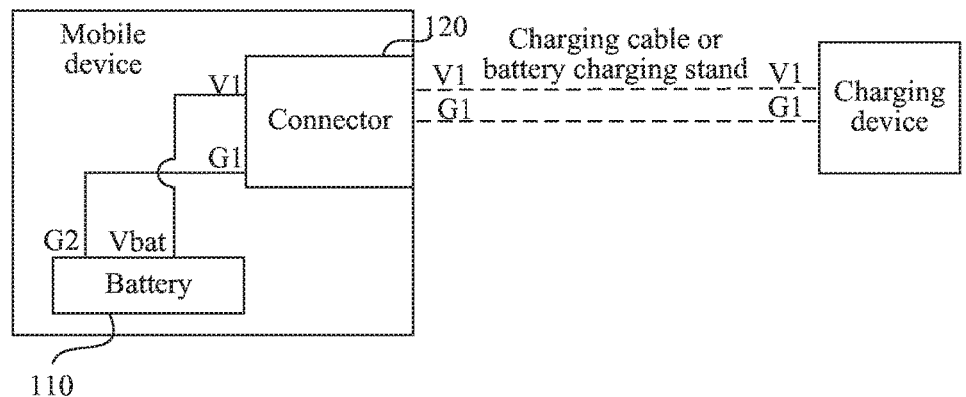
FIG. 1 is a schematic structural diagram of a mobile device according to Embodiment 1 of the present invention.

The following uses FIG. 1 as an example to describe a mobile device provided in an embodiment of the present invention, where FIG. 1 is a schematic structural diagram of the mobile device according to this embodiment of the present invention.

An implementation body of the embodiment shown in FIG. 1 is the mobile device. In FIG. 1, the mobile device includes the following components: a battery no and a connector 120.

The connector includes a charging pin V1 and a ground pin G1.

When the charging pin establishes a connection to an output pin of a charging device by using a charging cable or a battery charging stand, the charging pin receives a first current signal transmitted by the output pin of the charging device, and transmits the first current signal to an anode pin of a battery, so as to charge the battery.

Specifically, in this embodiment of the present invention, one end of the charging pin of the connector is connected to the anode pin of the battery, and the other end is connected to the output pin of the charging device by using the charging cable or the battery charging stand.

The charging cable can specifically endure a current signal of a high voltage and a high current. As an example instead of a limitation, the charging cable can specifically endure a high-current signal of 5 A, and can further endure a high-current signal that exceeds 5 A in an actual application.

It should be noted that in this embodiment of the present invention, the charging device is a charging device that provides electric energy, includes a charging circuit and may be connected to a common power supply. As an example instead of a limitation, to implement charging with a high current, the charging circuit in the charging device can provide a high-current signal, and the first current signal may be specifically a high-current signal of 5 A.

The mobile device in this embodiment of the present invention may directly receive, by using the connector, a high current provided by the charging device, so as to shorten a charging time. In addition, a charging circuit that provides a high current does not exist in the mobile device, but exists in the charging device, which makes the mobile device only receive a high current, so as to reduce a heat loss as much as possible.

Therefore, by means of an application of the mobile device provided in this embodiment of the present invention, the mobile device is connected to the charging device by using a charging cable or a battery charging stand, and receives a high current transmitted by the charging device, so as to charge a battery of the mobile device. In addition, a charging circuit that provides a high current is not included in the mobile device, but exists in the charging device, which makes the mobile device only receive a high current, so as to reduce a heat loss of the mobile device as much as possible. Further, a heat generation problem during a process of charging a mobile device in the prior art is resolved, the mobile device is also made to adapt to a charging mode in which a supply voltage and a supply current have been increased, and a solution in the prior art is also enriched.

Figure 2:
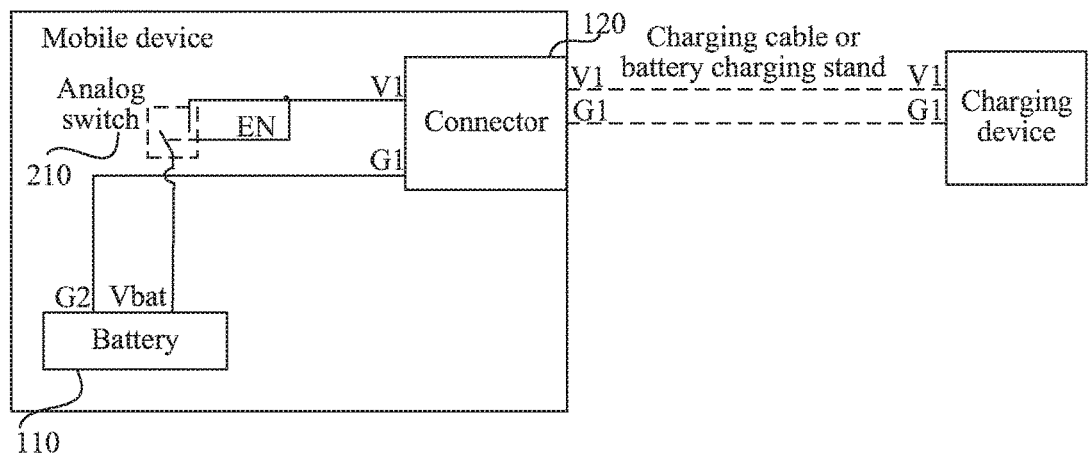
FIG. 2 is a schematic structural diagram of a mobile device according to Embodiment 2 of the present invention.

Optionally, based on the forgoing embodiment, the mobile device further includes an analog switch 210. As shown in FIG. 2, the analog switch in FIG. 2 may be a single-pole single-throw switch, and may be specifically implemented by using a field effect transistor.

As shown in FIG. 2, a lead EN is led from the charging pin V1 of the connector, and the lead EN is connected to a switch pin of the analog switch. When the charging pin V1 establishes a connection to an output pin V1 of a charging device by using a charging cable or a battery charging stand, a voltage of the lead EN changes, which triggers the analog switch to close, so as to connect the anode pin of the battery to the charging pin V1 of the connector.

When the connector is not connected to a charging device, the analog switch 210 is in a disconnected state, and the ground pin G1 of the connector is connected to a ground pin G2 of the battery.

The charging pin receives a first current signal transmitted by the output pin of the charging device, and transmits the first current signal to the anode pin of the battery by using the analog switch, so as to charge the battery.

Based on the forgoing embodiment, the analog switch 210 is added. When the charging pin establishes a connection to the output pin of the charging device by using a charging cable or a battery charging stand, the analog switch is triggered to connect the anode pin of the battery to the charging pin, which can prevent electric leakage of the connector when charging is not performed.

It may be understood that the lead EN is led from the charging pin V1 of the connector, and the lead EN is connected to the switch joint of the analog switch. If the voltage of the lead EN jumps from a low electrical level to a high electrical level, it indicates that the charging pin V1 has established a connection to the output pin V1 of the charging device by using the charging cable or the battery charging stand; if the voltage of the lead EN jumps from a high electrical level to a low electrical level, it indicates that the charging pin V1 has been disconnected from the output pin V1 of the charging device.

The charging pin V1 establishes a connection to an output pin V1 of an external charging device by using a charging cable or a battery charging stand, so that the charging pin V1 receives a first current signal, so as to charge the battery.

Figure 3:
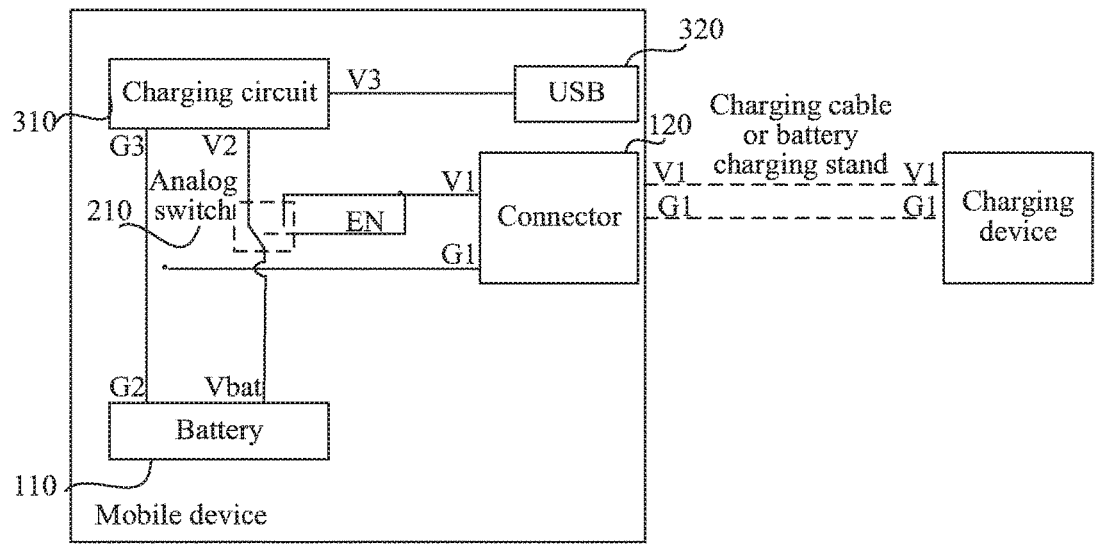
FIG. 3 is a schematic structural diagram of a mobile device according to Embodiment 3 of the present invention.

Optionally, based on the forgoing embodiment, the mobile device further includes a charging circuit 310 and a universal serial bus USB port 320. As shown in FIG. 3, the analog switch in FIG. 3 is a single-pole double-throw switch, and is specifically implemented by using a field effect transistor.

As shown in FIG. 3, when the connector is not connected to a charging device, the anode pin Vbat of the battery is connected to an output pin V2 of the charging circuit by using the analog switch, an input pin V3 of the charging circuit is connected to the USB port, a ground pin G3 of the charging circuit, the ground pin G2 of the battery and the ground pin G1 of the connector are connected to each other, and the charging pin V1 of the connector hangs in the air; one end of a voltage converting circuit is connected to the charging pin V1, and the other end is connected to a voltage pin Vdet of a controller.

Based on the forgoing embodiment, the charging circuit and the universal serial bus USB port are added. By adding the charging circuit and the USB port, when the charging pin V1 is disconnected from an output pin V1 of the charging device, the battery may still be charged by using the USB port, and data exchange with another mobile device may also be implemented by using the USB port.

When the charging pin V1 is disconnected from the output pin V1 of the charging device, the analog switch disconnects the anode pin Vbat of the battery from the charging pin V1, and the output pin V2 of the charging circuit is connected to the anode pin Vbat of the battery by using the analog switch.

The input pin V3 of the charging circuit is connected to the USB port, receives a second current signal transmitted by the USB port, and transmits the second current signal to the anode pin Vbat of the battery by using the output pin V2 of the charging circuit and the analog switch, so as to charge the battery.

It should be noted that in this embodiment of the present invention, the charging circuit 310 in the mobile device is configured to provide a direct current signal required by the battery, and specifically, a charging circuit in an existing mobile device may be used. In order not to make the mobile device generate an unendurable heat loss due to charging with a high current, the charging circuit in the mobile device is set to provide a low-current signal.

It should be noted that in this embodiment of the present invention, the mobile device (such as a mobile phone or a tablet computer) may further be connected to another mobile device (such as a desktop computer or a notebook computer) by using the USB port. The another mobile device may be connected to a common power supply, so as to provide electric energy for the mobile device in this embodiment of the present invention. As an example instead of a limitation, the second current signal may be specifically a low-current signal of 2 A. The charging device in this embodiment includes a charging circuit, where the charging circuit can provide a high-current signal, for example, a current signal of 5 A.

The mobile device in this embodiment of the present invention may directly receive, by using the connector, a high current provided by the charging device, so as to shorten a charging time. In addition, a charging circuit that provides a high current does not exist in the mobile device, but exists in the charging device, which makes the mobile device only receive a high current, so as to reduce a heat loss as much as possible. Further, the charging circuit in the mobile device is a charging circuit that can maintain the low-current signal of 2 A. Therefore, a heat loss of the mobile device can be further reduced.

It may be understood that in the mobile device shown in FIG. 3, when the charging pin V1 establishes a connection to the output pin V1 of the charging device by using a charging cable or a battery charging stand, a voltage of the lead EN changes.

Specifically, as shown in FIG. 3, the lead EN is led from the charging pin V1 of the connector, and the lead EN is connected to the switch joint of the analog switch. If the voltage of the lead EN jumps from a low electrical level to a high electrical level, it indicates that the charging pin V1 has established a connection to the output pin V1 of the charging device by using the charging cable or the battery charging stand; if the voltage of the lead EN jumps from a high electrical level to a low electrical level, it indicates that the charging pin V1 has been disconnected from the output pin V1 of the charging device.

The charging pin V1 establishes a connection to an output pin V1 of an external charging device by using a charging cable or a battery charging stand, so that the charging pin V1 receives a first current signal, so as to charge the battery.

Figure 4:
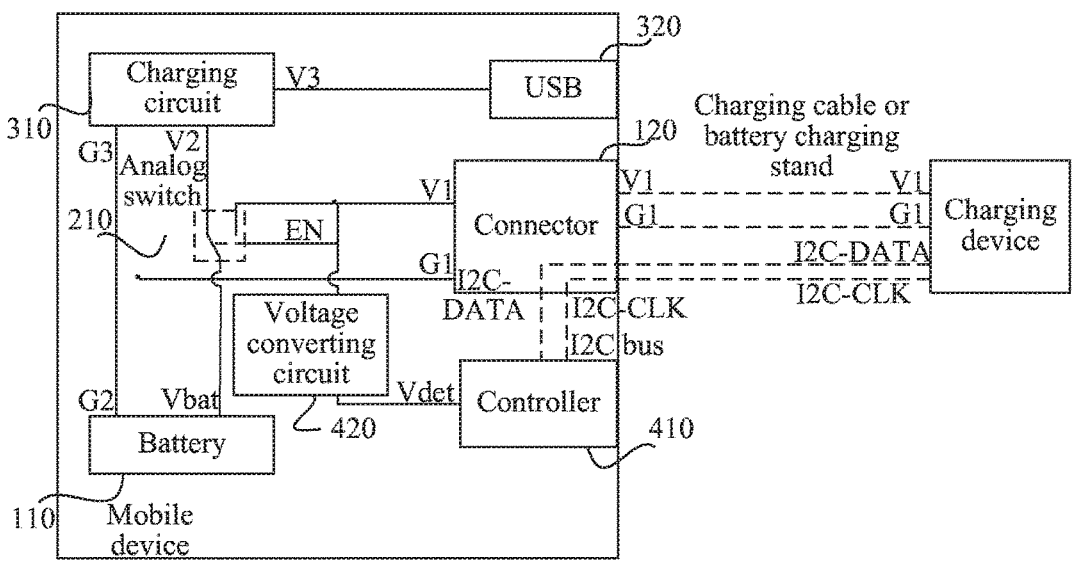
FIG. 4 is a schematic structural diagram of a mobile device according to Embodiment 4 of the present invention.

Optionally, based on the forgoing embodiment, the mobile device further includes a controller 410 and a voltage converting circuit 420, as shown in FIG. 4.

With one end connected to the charging pin V1, and the other end connected to a voltage pin Vdet of the controller, the voltage converting circuit is configured to: when the charging pin V1 establishes a connection to an output pin of a charging device by using a charging cable or a battery charging stand, detect a voltage of the charging pin, convert the voltage and then transmit a converted voltage to the controller, so that the controller determines that the mobile device established a connection to the charging device.

In this embodiment of the present invention, the voltage converting circuit adjusts a detected voltage of the charging pin to a voltage that can be endured by the controller. For example, the voltage of the charging pin is a voltage of approximately 10 V, and the voltage that can be endured by the controller is 2 V; then, the voltage converting circuit adjusts the voltage of the charging pin to a voltage of 2 V that can be endured by the controller, so that the controller determines that the mobile device has established a connection to the charging device.

Optionally, based on the forgoing embodiment, the controller further includes a bus port, the connector further includes a single-wire or multi-wire bus pin, and the charging device includes a bus port (not clearly shown in FIG. 4).

The bus port of the controller is connected to the single-wire or multi-wire bus pin by using a bus, and the single-wire or multi-wire bus pin of the connector is also connected to a bus pin of the charging device by using the bus. When the connector is connected to the charging device, the bus port of the controller is connected to the bus port of the charging device by using the single-wire or multi-wire bus pin of the connector. The bus is configured to transmit bus data or a control signal generated by the controller, so that the pin corresponding to the charging device adjusts an output first current signal after receiving the bus data or the control signal.

In a preferred embodiment, the bus may be an inter-integrated circuit I2C bus, and the single-wire or multi-wire bus pin included in the connector is an I2C data signal pin I2C-DATA and an I2C clock pin I2C-CLK, as shown in FIG. 4.

The I2C data signal pin I2C-DATA is connected to the bus port of the controller, and is configured to transmit I2C data signal or a control signal generated by the controller; the I2C clock pin I2C-CLK is connected to the bus port of the controller, and is configured to transmit an I2C clock signal generated by the controller, so that the bus port of the charging device adjusts the output first current signal after receiving the I2C data signal or the control signal, and the I2C clock signal.

Specifically, the mobile device transmits, by using the I2C data signal pin I2C-DATA and the I2C clock pin I2C-CLK of the connector and the I2C bus, the I2C data signal or the control signal, and the I2C clock signal to the bus port of the charging device. In an example, after the mobile device establishes a connection to the charging device by using a charging cable, charging is performed. During a charging process, when the controller determines that a first current signal provided by the charging device is so high that the mobile device cannot endure, the controller may notify the charging device of a required first current signal by transmitting I2C data signal or a control signal, and an I2C clock signal to the charging device, so that the charging device adjusts the output first current signal according to the I2C data signal or the control signal, and the I2C clock signal that are received by the corresponding port.

It may be understood that the foregoing describes working processes of the bus port of the controller and the bus pin of the connector by using an I2C bus as an example. In an actual application, a connection between the bus port of the controller and the single-wire or multi-wire bus pin of the connector is not limited to use of an I2C bus, and an SPI bus or the like may also be used.

Optionally, the ground pin G1 of the connector is connected to a first ground pin G1 of the charging device by using the charging cable or the battery charging stand, and the ground pin G1, the ground pin G2 of the battery and the ground pin G3 of the charging circuit are connected to each other.

Optionally, the connector is specifically a multi-pin port, a multi-contact port, or a port multiplexed with the USB port by using the analog switch.

Figure 5:
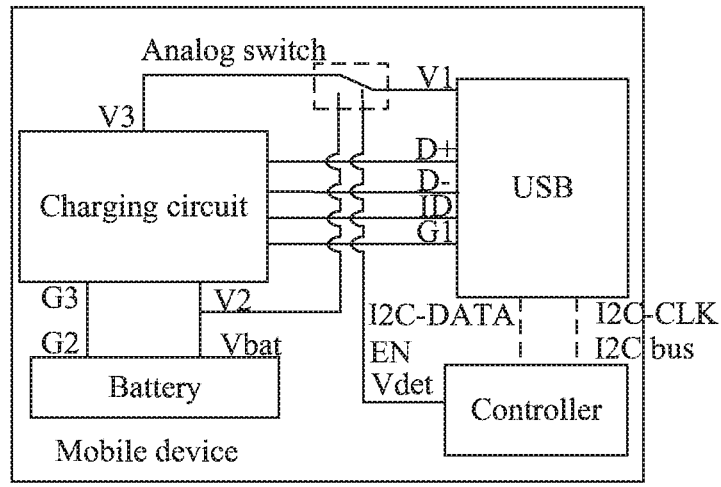
FIG. 5 is a schematic structural diagram of a mobile device according to Embodiment 5 of the present invention.

Specifically, the connector in the mobile device provided in this embodiment of the present invention may be one of multiple types of ports, such as a multi-pin port, a multi-contact port, or a port multiplexed with the USB port by using the analog switch. As an example instead of a limitation, in FIG. 5, an analog switch and a USB port are multiplexed to serve as a connector. In FIG. 5, the analog switch and the USB port are multiplexed, so as to implement functions of the connector in the foregoing embodiment. A charging process implemented by the mobile device is as follows: When the mobile device does not establish a connection to a charging device, the analog switch is connected to the charging circuit of the mobile device by default. The lead EN is led from the voltage pin of the controller, and the lead EN is connected to the switch joint of the analog switch. When the mobile device establishes a connection to the charging device by using a charging cable or a battery charging stand, the analog switch remains connected to the charging circuit when the controller detects, by using a USB ID pin, that the mobile device is connected to a computer or another USB device by using a USB to perform USB charging; when the controller detects, by using the USB ID pin, that the mobile device is charged by using the charging device, a voltage of the lead EN jumps from a low electrical level to a high electrical level, and the analog switch is disconnected from the charging circuit, and is connected to a Vbat pin of the battery through switching, so as to complete charging of the battery. FIG. 5 is only an example for implementing the functions of the connector by using another method, and no limitation is constituted thereto in an actual application.

To make the objectives, technical solutions, and advantages of the present invention clearer, the following further describes the embodiments of the present invention in detail with reference to the accompanying drawings.

Figure 6:
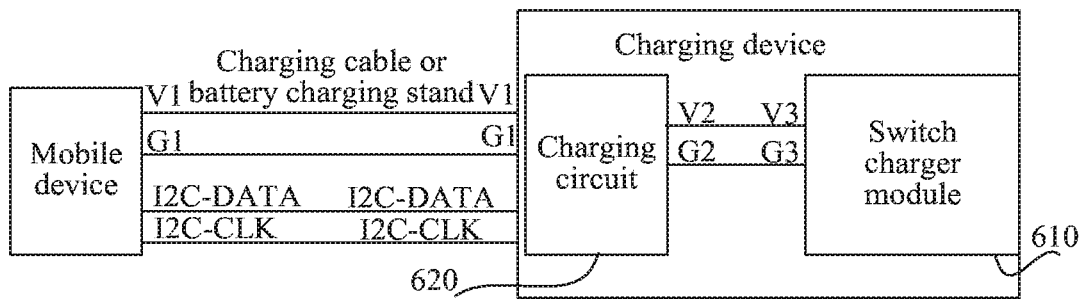
FIG. 6 is a schematic structural diagram of a charging device according to an embodiment of the present invention.

The following uses FIG. 6 as an example to describe a charging device provided in an embodiment of the present invention, where FIG. 6 is a schematic structural diagram of the charging device according to this embodiment of the present invention.

An implementation body of the embodiment shown in FIG. 6 is the charging device. As shown in FIG. 6, the charging device includes the following parts: a switch charger module 610 and a charging circuit 620.

In FIG. 6, an output pin V3 and a ground pin G3 of the switch charger module are respectively connected to an input pin V2 and a second ground pin G2 of the charging circuit, an output pin V1 of the charging circuit is connected to a charging pin V1 of a mobile device by using a charging cable or a battery charging stand, and a first ground pin G1 of the charging circuit is connected to a ground pin G1 of the mobile device by using a charging cable or a battery charging stand.

In the charging device, the charging circuit includes the output pin V1 and the input pin V2.

The input pin V2 is connected to the output pin V3 of the switch charger module, and is configured to receive a first current signal transmitted by the output pin V3 of the switch charger module.

The output pin V1 establishes a connection to the charging pin V1 of the mobile device by using a charging cable or a battery charging stand, so as to use the first current signal to charge a battery of the mobile device.

Specifically, when the output pin V1 of the charging circuit establishes a connection to the charging pin V1 of the mobile device by using a charging cable or a battery charging stand, the output pin V1 transmits a carried voltage to the charging pin V1, which makes a voltage of a lead EN connected to the charging pin V1 jump, so as to connect an analog switch in the mobile device to the charging pin V1, so that the first current signal is transmitted to an anode pin Vbat of the battery by using the analog switch, so as to charge the battery in the mobile device.

In this embodiment of the present invention, the charging cable can specifically endure a current signal of a high voltage and a high current. As an example instead of a limitation, the charging cable can specifically endure a high-current signal of 5 A, and can further endure a high-current signal that exceeds 5 A in an actual application.

Further, the switch charger module in this embodiment of the present invention is configured to: connect to a power supply, receive an alternating current signal transmitted by the power supply, convert the alternating current signal into a direct current signal, and transmit the direct current signal to the charging circuit.

The charging circuit is configured to: receive the direct current signal, convert the received direct current signal into a direct current signal required by the battery of the mobile device, and transmit, by using a charging cable or a battery charging stand, the direct current signal required by the battery to the mobile device, where the direct current signal that is required by the battery and that is transmitted to the mobile device is a first current signal.

The switch charger module is connected to a common power supply, and receives an alternating current signal (for example, an alternating current of 220 V) transmitted by the power supply. The switch charger module converts the alternating current signal into a direct current signal (for example, a direct current of 110 V), and transmits the direct current signal, which is obtained after conversion, to the input pin V2 of the charging circuit by using the output pin V3.

The charging circuit receives, by using input pin V2, the direct current signal transmitted by the switch charger module, converts, according to a charge curve of the battery of the mobile device, the direct current signal into a direct current signal required by the battery, and transmits, by using the output pin V1 of the charging circuit and a charging cable or a battery charging stand, the direct current signal required by the battery to the charging pin V1 of the mobile device.

Herein, a charge curve of a battery is a characteristic curve of charging of the battery. For example, when the battery is empty (a battery level is zero), in this case, the battery can receive only a low current for charging, and therefore, the charging circuit provides a current signal of a low current for the battery according to the charge curve of the battery. When there is a certain amount of electricity in the battery (the battery level is 20% of a total battery capacity), in this case, the battery can receive a high current for charging, and therefore, the charging circuit provides a current signal of a high current for the battery according to the charge curve of the battery.

It should be noted that in this embodiment of the present invention, the charging device is a charging device that provides electric energy and may be connected to a common power supply. As an example instead of a limitation, the first current signal may be specifically a high-current signal of 5

A. In this embodiment of the present invention, the charging circuit that provides a high-current signal is disposed in the charging circuit; therefore, the mobile device may directly receive, by using a connector, a high current provided by the charging device, so as to shorten a charging time, so that a heat loss is reduced as much as possible a high current is disposed in the charging device.

Optionally, the charging circuit further includes a bus port.

The bus port of the charging circuit is connected to a bus pin of the connector in the mobile device, and is configured to receive bus data or a control signal transmitted by the mobile device.

The charging circuit is further configured to adjust the first current signal according to the bus data or the control signal.

In a preferred embodiment, when a bus is an I2C bus, the bus port of the charging circuit includes an I2C data signal pin I2C-DATA and an I2C clock pin I2C-CLK.

The I2C data signal pin I2C-DATA in the charging circuit is connected to an I2C data signal pin I2C-DATA of the connector in the mobile device, and is configured to receive I2C data signal or a control signal generated by a controller in the mobile device.

The I2C clock pin I2C-CLK in the charging circuit is connected to an I2C clock pin I2C-CLK of the connector in the mobile device, and is configured to receive an I2C clock signal generated by the controller in the mobile device.

The charging circuit is further configured to adjust the first current signal according to the I2C data signal or the control signal, and the I2C clock signal.

Specifically, the mobile device transmits the I2C data signal or the control signal, and the I2C clock signal to the charging device by using the I2C data signal pin I2C-DATA and the I2C clock pin I2C-CLK of the connector and the I2C bus. In an example, after the mobile device establishes a physical connection to the charging device by using a charging cable, charging is performed. During a charging process, when the controller determines that a first current signal provided by the charging device is so high that the mobile device cannot endure, the controller may notify the charging device of a required first current signal by transmitting I2C data signal or a control signal, and an I2C clock signal to the charging device, so that the charging device adjusts the output first current signal according to the I2C data signal or the control signal, and the I2C clock signal that are received, and then transmits an adjusted first current signal to an anode pin V1 of the connector in the mobile device by reusing the charging cable.

It may be understood that the foregoing describes a working process of the bus port of the charging circuit by using an I2C bus as an example. In an actual application, a type of a bus is not limited to an I2C bus, and may also be an SPI bus or the like.

Optionally, the charging circuit further includes the first ground pin G1 and the second ground pin G2.

The first ground pin G1 is connected to the ground pin G1 of the mobile device by using a charging cable or a battery charging stand.

The second ground pin G2 is connected to the ground pin G3 of the switch charger module.

Optionally, the charging circuit is specifically a switch charging circuit or a linear charging circuit.

Specifically, in this embodiment of the present invention, a charging circuit that can provide a high current is disposed in the charging device, so as to reduce a heat loss of a mobile device. However, a heat loss of the charging device is easily caused if a charging circuit that provides a high current is disposed in the charging device; therefore, in this embodiment of the present invention, the charging circuit may be specifically set as a switch charging circuit or a linear charging circuit, so as to reduce a heat loss of the charging device. Either the switch charging circuit or the linear charging circuit is a circuit well known to a person skilled in the art, and therefore, details are not described herein again.

Therefore, by means of an application of the charging device provided in this embodiment of the present invention, a charging circuit that can provide a high current is added in the charging device, to transmit a high current to a mobile device by using a charging cable, which makes the mobile device only receive a high current, so as to reduce a heat loss of the mobile device as much as possible. Further, a heat generation problem during a process of charging a mobile device in the prior art is resolved, the mobile device is also made to adapt to a charging mode in which a supply voltage and a supply current have been increased, and a solution in the prior art is also enriched.

Figure 7:
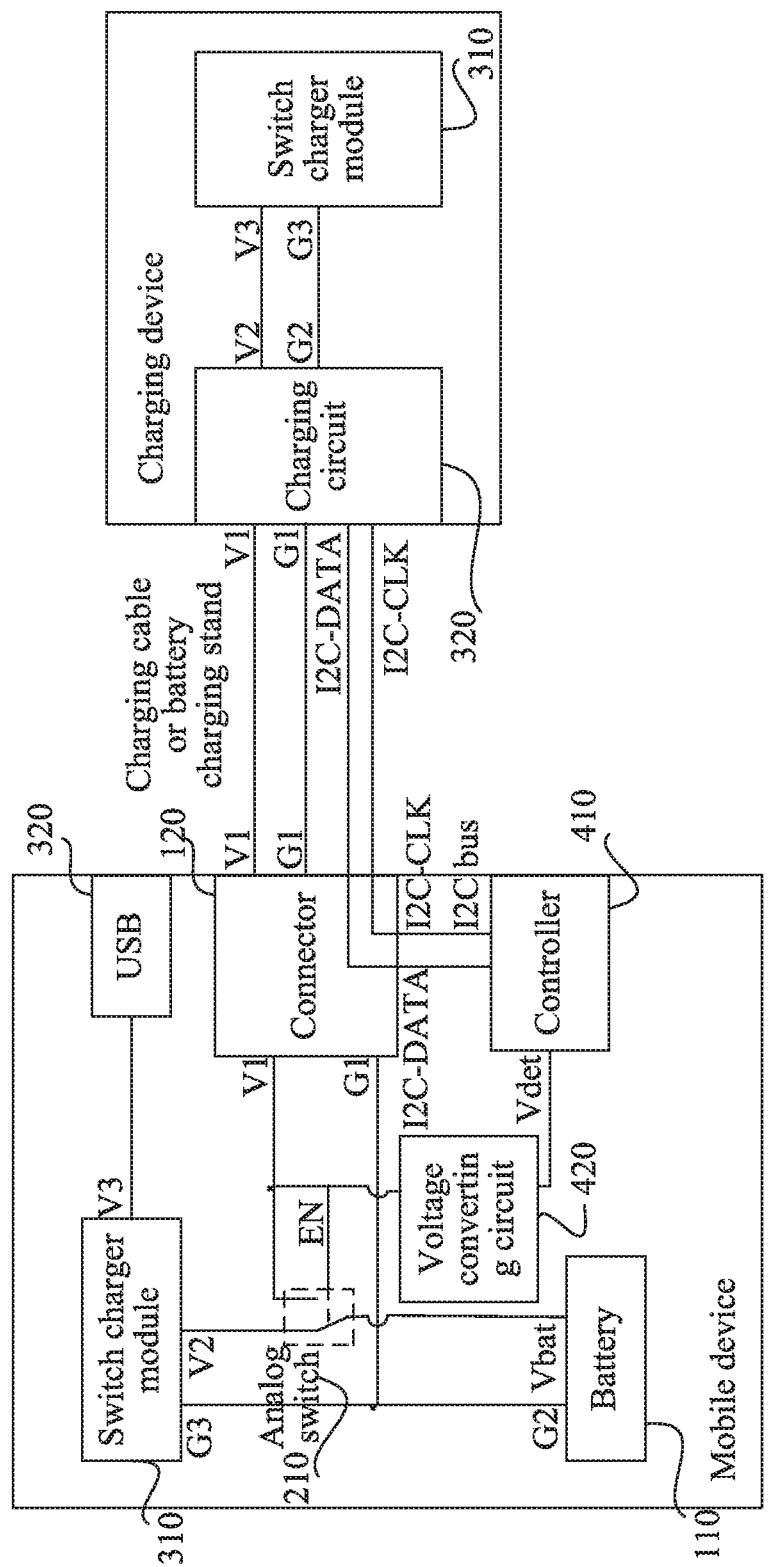
FIG. 7 is a schematic diagram of a connection system that includes a mobile device and a charging device according to an embodiment of the present invention.

In the foregoing multiple embodiments, a mobile device and a charging device are separately used as implementation bodies to briefly describe charging processes. Further, the charging processes described in the foregoing embodiments may be completed by using a connection system of a mobile device and a charging device shown in FIG. 7. As shown in FIG. 7, the mobile device includes the foregoing multiple components, and a specific charging process is as follows.

The foregoing has described a connection relationship between pins of a mobile device and those inside a charging device, and details are not described herein again. When a charging pin V1 establishes a connection to an output pin V1 of the charging device by using a charging cable or a battery charging stand, an analog switch connects an anode pin Vbat of a battery to the charging pin V1; the charging pin V1 receives a first current signal transmitted by the output pin V1 of the charging device, and transmits the first current signal to the anode pin Vbat of the battery by using the analog switch, so as to charge the battery.

Further, the mobile device may further perform exchange communication with the charging device by using an I2C bus, and the mobile device transmits an I2C data signal and an I2C control signal to the charging device by using the I2C bus, so that the charging device adjusts an output current signal.

The foregoing describes a charging process performed after a mobile device establishes a connection to a charging device by using a charging cable. When the mobile device is disconnected from the charging device (not shown in the figure), the mobile device may receive a second current signal from a USB port by using a charging circuit of the mobile device, so as to charge a battery. Charging a battery by using a USB port is the prior art; therefore, details are not described herein again.

To make the objectives, technical solutions, and advantages of the present invention clearer, the following further describes the embodiments of the present invention in detail with reference to the accompanying drawings.

Figure 8:
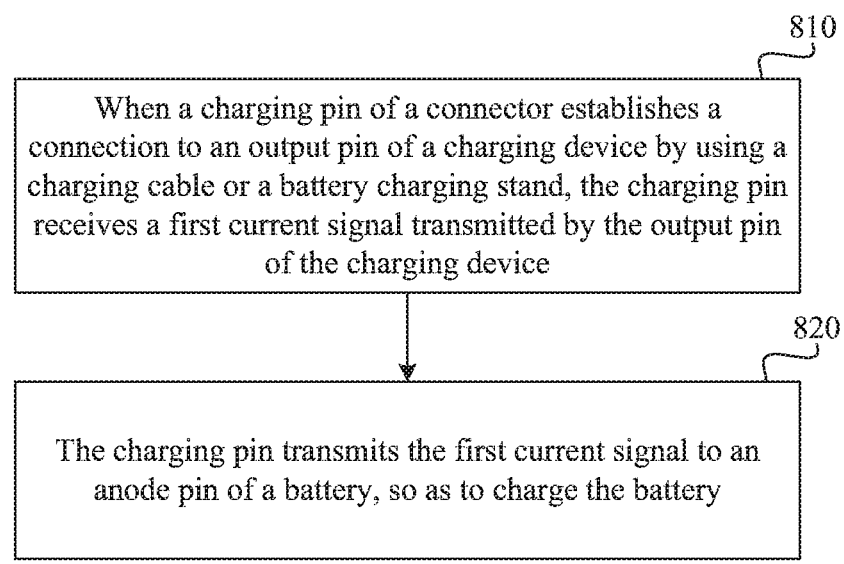
FIG. 8 is a flowchart of a charging method according to an embodiment of the present invention.

The following uses FIG. 8 as an example to describe a charging method provided in an embodiment of the present invention, where FIG. 8 is a flowchart of the charging method according to this embodiment of the present invention. The charging method provided in this embodiment of the present invention is based on the mobile device and the charging device that are described in the foregoing embodiments.

As shown in FIG. 8, the charging method specifically includes the following steps.

Step 810: When a charging pin of a connector establishes a connection to an output pin of a charging device by using a charging cable or a battery charging stand, the charging pin receives a first current signal transmitted by the output pin of the charging device.

Further, in this embodiment of the present invention, one end of the charging pin of the connector is connected to an anode pin of a battery, and the other end is connected to the output pin of the charging device by using a charging cable or a battery charging stand. The charging cable can specifically endure a current signal of a high voltage and a high current. As an example instead of a limitation, the charging cable can specifically endure a high-current signal of 5 A, and can further endure a high-current signal that exceeds 5 A in an actual application.

It should be noted that in this embodiment of the present invention, the charging device is a charging device that provides electric energy and may be connected to a common power supply. As an example instead of a limitation, the first current signal may be specifically a high-current signal of 5 A.

Step 820: The charging pin transmits the first current signal to an anode pin of a battery, so as to charge the battery.

Specifically, the charging pin of the connector is connected to the anode pin of the battery. After the charging pin receives the first current signal output by the output pin of the charging device, the charging pin transmits the first current signal to the anode pin of the battery, so as to charge the battery.

It may be understood that a mobile device in this embodiment of the present invention may directly receive, by using a connector, a high current provided by a charging device, so as to shorten a charging time. In addition, a charging circuit that provides a high current does not exist in the mobile device, but exists in the charging device, which makes the mobile device only receive a high current, so as to reduce a heat loss as much as possible.

Optionally, an embodiment of the present invention further provides another charging method.

An analog switch is disposed between the anode pin of the battery and the charging pin. When the charging pin of the connector establishes a connection to the output pin of the charging device by using a charging cable or a battery charging stand, the analog switch connects the anode pin of the battery to the charging pin.

Further, the charging cable can specifically endure a current signal of a high voltage and a high current. As an example instead of a limitation, the charging cable can specifically endure a high-current signal of 5 A, and can further endure a high-current signal that exceeds 5 A in an actual application.

The charging pin receives the first current signal transmitted by the output pin of the charging device.

Specifically, the charging pin receives, by using a charging cable or a battery charging stand, the first current signal output by the output pin of the charging device.

It should be noted that in this embodiment of the present invention, the charging device is a charging device that provides electric energy and may be connected to a common power supply. As an example instead of a limitation, the first current signal may be specifically a high-current signal of 5 A.

The charging pin transmits the first current signal to the anode pin of the battery by using the analog switch, so as to charge the battery.

Specifically, the analog switch connects the charging pin of the connector to the anode pin of the battery; therefore, after receiving the first current signal output by the output pin of the charging device, the charging pin transmits the first current signal to the anode pin of the battery by using the analog switch, so as to charge the battery.

It may be understood that a mobile device in this embodiment of the present invention may directly receive, by using a connector, a high current provided by a charging device, so as to shorten a charging time. In addition, a charging circuit that provides a high current does not exist in the mobile device, but exists in the charging device, which makes the mobile device only receive a high current, so as to reduce a heat loss as much as possible.

Optionally, this embodiment of the present invention further includes a step in which when the charging pin of the connector is disconnected from the output pin of the charging device, the battery may still be charged by using a USB port. The mobile device may also perform data exchange with another mobile device by using the USB port.

When the charging pin is disconnected from the output pin of the charging device, the analog switch disconnects the anode pin of the battery from the charging pin, and an output pin of the charging circuit is connected to the anode pin of the battery by using the analog switch.

An input pin of the charging circuit receives a second current signal by using the USB port.

Specifically, the input pin of the charging circuit is connected to the USB port and receives the second current signal by using the USB port.

Further, in this embodiment of the present invention, the mobile device (such as a mobile phone or a tablet computer) may further be connected to another mobile device (such as a desktop computer or a notebook computer) by using the USB port. The another mobile device may be connected to a common power supply, so as to provide electric energy for the mobile device in this embodiment of the present invention. As an example instead of a limitation, the second current signal may be specifically a low-current signal of 2 A.

The input pin of the charging circuit transmits the second current signal to the anode pin of the battery by using the output pin of the charging circuit and the analog switch, so as to charge the battery.

Specifically, the output pin of the charging circuit is connected to a voltage pin of the battery by using the analog switch, and the input pin of the charging circuit is connected to the USB port; therefore, after receiving the second current signal by using the USB port, the input pin of the charging circuit transmits the second current signal to the battery by using the output pin of the charging device and the analog switch, so as to charge the battery.

It may be understood that a mobile device in this embodiment of the present invention may directly receive, by using a connector, a high current provided by a charging device, so as to shorten a charging time. In addition, a charging circuit that provides a high current does not exist in the mobile device, but exists in the charging device, which makes the mobile device only receive a high current, so as to reduce a heat loss as much as possible. Further, the charging circuit in the mobile device is a charging circuit that can maintain the low-current signal of 2 A. Therefore, a heat loss of the mobile device can be further reduced.

Optionally, this embodiment of the present invention further includes a step of performing exchange communication by the mobile device with the charging device by using a bus.

A controller generates bus data or a control signal.

Specifically, during the foregoing process described in step 810 and step 820, after the mobile device establishes a connection to the charging device by using a charging cable, charging is performed. During a charging process, when the controller determines that a first current signal provided by the charging device is so high that the mobile device cannot endure, the controller generates bus data or a control signal.

The controller transmits the bus data or the control signal to a bus port of the charging device by using a bus port and a single-wire or multi-wire bus pin of the connector, so that the charging device adjusts an output first current signal.

Therefore, by means of an application of the charging method provided in this embodiment of the present invention, a mobile device is connected to a charging device by using a charging cable, and receives a high current transmitted by the charging device, so as to charge a battery of the mobile device. In addition, a charging circuit that provides a high current is not included in the mobile device, but exists in the charging device, which makes the mobile device only receive a high current, so as to reduce a heat loss of the mobile device as much as possible. Further, a heat generation problem during a process of charging a mobile device in the prior art is resolved, the mobile device is also made to adapt to a charging mode in which a supply voltage and a supply current have been increased, and a solution in the prior art is also enriched.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

Steps of methods or algorithms described in the embodiments disclosed in this specification may be implemented by hardware, a software module executed by a processor, or a combination thereof. The software module may reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

In the foregoing specific implementation manners, the objective, technical solutions, and benefits of the present invention are further described in detail. It should be understood that the foregoing descriptions are only specific implementation manners of the present invention, but are not intended to limit the protection scope of the present invention. Any modification, equivalent replacement, or improvement made without departing from the spirit and principle of the present invention should fall within the protection scope of the present invention.

What is claimed is:

1. A system comprising:
   a mobile device; and
   a charging device comprising a charging circuit and a first universal serial bus (USB) port, the charging device is connected to the mobile device through the first USB port and a removable charging cable;
   wherein the mobile device comprises:
   a battery,
   a second USB port,
   a controlling circuit, and
   a connector,
      the connector comprising a first charging pin and a first ground pin,
      the first charging pin is configured to receive a first current from the charging device to charge the battery,
      the second USB port comprises a second charging pin and a second ground pin,
      the second charging pin is configured to receive a second current from the charging device to charge the battery,
      the connector is one port of the mobile device in which the second USB port is integrated, and
      if the battery receives the first current through the first charging pin, the controlling circuit is configured to send a control signal to the charging device for adjusting the first current.

2. The system according to claim 1, wherein the first current that the first charging pin is configured to receive from the charging device is at least 2 A.

3. The system according to claim 1, wherein the mobile device further comprises a charging circuit, wherein
   the second charging pin is connected to the battery through the charging circuit.

4. The system according to claim 1, wherein the mobile device further comprises an analog switch, wherein
   when the first charging pin is connected to the charging device, the analog switch is configured to connect the battery to the first charging pin; and
   when the first charging pin is disconnected from the charging device, the analog switch is configured to disconnect the battery from the first charging pin.

5. The system according to claim 1, wherein the mobile device further comprises a voltage converting circuit, wherein
   one end of the voltage converting circuit is connected to the first charging pin, and another end of the voltage converting circuit is connected to the controlling circuit; and
   the voltage converting circuit is configured to transmit a converted voltage to the controlling circuit when the first charging pin is connected to the charging device.

6. The system according to claim 1, wherein the second USB port comprises an ID pin being coupled to the controlling circuit for the controlling circuit determining whether the mobile device connects to a USB device.

7. The system according to claim 1, wherein
   When a battery level of the battery is lower than a predetermined value, the charging device is configured to provide a third current lower than the first current; and
   When the battery level of the battery is more than the predetermined value, the charging device is configured to provide a fourth current,
   wherein the third current is less than the fourth current.

8. The system according to claim 1, wherein the second charging pin is different from the first charging pin.

9. The system according to claim 8, wherein the second ground pin is different from the first ground pin.

10. A mobile device comprising:
    a battery, a connector, a universal serial bus (USB) port, and a controlling circuit;

the connector comprises a first charging pin and a first ground pin, wherein the first charging pin is configured to receive a first current from a charging device to charge the battery, the USB port comprises a second charging pin and a second ground pin, wherein the second charging pin is configured to receive a second current from the charging device to charge the battery, the connector is one port of the mobile device in which the USB port is integrated, and if the battery receives the first current through the first charging pin, the controlling circuit is configured to send a control signal to the charging device for adjusting the first current provided by a charging circuit in the charging device.

11. The mobile device according to claim 10, further comprising a charging circuit, wherein the second charging pin is connected to the battery through the charging circuit.

12. The mobile device according to claim 10, further comprising an analog switch, wherein when the first charging pin is connected to the charging device, the analog switch is configured to connect the battery to the first charging pin; and when the first charging pin is disconnected from the charging device, the analog switch is configured to disconnect the battery from the first charging pin.

13. The mobile device according to claim 10, wherein the USB port comprises an ID pin being coupled to the controlling circuit for the controlling circuit determining whether the mobile device connects to a USB device.

14. The mobile device according to claim 10, wherein when a battery level of the battery is lower than a predetermined value, the charging device is configured to provide a third current; and when the battery level of the battery is more than the predetermined value, the charging device is configured to provide a fourth current, wherein the third current is less than the fourth current.

15. The mobile device according to claim 10, wherein the second charging pin is different from the first charging pin.

16. The mobile device according to claim 15, wherein the second ground pin is different from the first ground pin.

17. A charging device comprising:

a universal serial bus (USB) port;

a switch charging circuit configured to convert an alternating current (AC) from a power socket to a direct current (DC);

a charging circuit comprising an input pin and an output pin, wherein the input pin is configured to receive the DC from the switch charging circuit, the output pin is connected to a charging pin of the USB port; and when the charging device is connected to a mobile device through the USB port, the charging device is configured to:

receive a control signal from the mobile device; and in response to receiving the control signal, adjust a current provided by the charging circuit for charging the mobile device.

18. The charging device according to claim 17, further configured to:

receive information of a battery level of a battery in the mobile device;

when the battery level of the battery is lower than a predetermined value, the charging device is configured to provide a first current; and when the battery level of the battery is more than the predetermined value the charging device is configured to provide a second current, wherein the first current is less than the second current.

19. The charging device according to claim 17, wherein a current provided through the charging pin of the USB port is at least 2 A.

* * * * *